TELEPHONE INTERRUPTER FAILURE DETECTION CIRCUIT

Filed Aug. 23, 1968 2 Sheets-Sheet 1

INVENTOR
RABINDRA N. BASU
BY Curphey & Erickson
PATENT AGENTS

TELEPHONE INTERRUPTER FAILURE DETECTION CIRCUIT

Filed Aug. 23, 1968 2 Sheets-Sheet 2

INVENTOR
RABINDRA N. BASU
BY Curphey & Erickson
PATENT AGENTS

United States Patent Office 3,555,410

Patented Jan. 12, 1971

3,555,410

TELEPHONE INTERRUPTER FAILURE DETECTION CIRCUIT

Rabindra N. Basu, Ottawa, Ontario, Canada, assignor to Northern Electric Company Limited, Montreal, Quebec, Canada Filed Aug. 23, 1968, Ser. No. 754,829
Int. Cl. G01r *31/02*
U.S. Cl. 324—28 3 Claims

ABSTRACT OF THE DISCLOSURE

An apparatus for detecting the failure of any switch in two sets of sequentially operated switches used to interrupt a corresponding source of voltage to form two sets of switch signals. Each set of switch signals is integrated to form a separate output signal of relatively constant amplitude, the amplitude being dependent upon the proper operation of each switch in both sets. A voltage sensitive amplifier monitors both output signals and responds to activate an alarm circuit in the event that the amplitude of either output signal falls below a predetermined value.

This invention relates to circuit failure detection circuits and more particularly to switch failure detection circuits.

A telephone system is one application in which monitoring of a large number of switches is both desirable and indeed necessary, especially if an aim of the system is to provide trouble-free consumer service. In this particular application, such switches, commonly referred to as interrupters, are used in telephone offices for providing the interruptions for ringing, tones, and signalling. Rotary interrupters as well as relay interrupters use a number of switch contacts, commonly known as brushes, to provide the required interruptions. Such electromechanical interrupters have been used in the past, but they do suffer from the disadvantage of requiring regular and frequent maintenance and also from the disadvantage of relatively short lifetimes. Disadvantages such as these have now been overcome through the use of solid state switches. Accordingly, an ideal switch failure detection circuit would be both responsive to a solid state switch as well as to an electromechanical switch. This situation imposes still other requirements on an interrupter monitor, i.e., to be able to function at lower operating voltages, as commonly experienced with solid state switch devices, and to present a sufficient degree of isolation between such solid state switches to obviate any deleterious interactions.

In one known telephone system application solid state interrupters as hereinabove described are used to provide interruptions for ringing, tones, and signalling. A separate monitor is used for each corresponding pair of brushes. Each such monitor comprises one detector which consists of a rectifier and filter. The detected signals are sensed by corresponding ferrod sensors, one for each pair of brushes, which form a part of a master scanner. A preferred embodiment of my invention, which is to be described, is considerably more simple in design since it uses fewer and less expensive components, and being more simple has the advantage of greater reliability since there are fewer components which may become faulty. Furthermore, each detector in the known system requires one detecting signal along with an associated ferrod sensor for each pair of corresponding brushes. The preferred embodiment of the invention herein described does not require a separate detecting signal inasmuch as use is made of voltages available from the ringing and signalling supplies for this purpose. In this connection, my invention may also be used to detect the failure of the ringing alternating current power supply and the direct current signalling power supply as well as the conditions of the various interrupters used.

The preferred embodiment of the invention disclosed herein is a new switch-failure detection circuit, of an improved and simplified form, and may be used advantageously to overcome the problems of switch-failure detection circuit complexity as hereinabove described. The new circuit comprises in part a first switching means which has an input terminal for connection to a first source of voltage for switching therefrom a voltage signal to sequentially and cyclically energize a first set of output terminals, the switched voltage signal comprising a first set of switch signals. Another portion of this new circuit comprises a second switching means having an input terminal for connection to a second source of voltage, which is in a series connection with the first source of voltage, for switching therefrom the summed voltage signal to sequentially and cyclically energize a second set of output terminals, the switched summed voltage signal comprising a second set of switch signals. The terminals in the first set of output terminals correspond to the terminals in the second set of output terminals to form corresponding pairs of output terminals. Both sets of output terminals are energized in a predetermined sequence in which any one terminal of the second set of output terminals is energized concurrently with all the terminals of the first set of output terminals save the one terminal which corresponds to the one energized terminal of the second set of output terminals. Each one of a plurality of signal coupling means interconnects corresponding pairs of terminals from the first and second sets of output terminals so that in the event of a fault condition, in which any corresponding pair of output terminals are concurrently energized, the respective one signal coupling means will act as a load connected across the second source of voltage and will decrease the voltage thereof. Included also are first and second signal detection and integration means which are responsive to their respective first and second sets of switch signals, for producing first and second output signals. A third signal detection means is present which is responsive to the amplitudes of the first and second output signals and from which an indication of a switch failure is given when either output signal amplitude falls below a predetermined value.

A preferred embodiment of the invention herein described will be fully understood from the following detailed description taken in connection with the appended drawings in which, FIG. 1 is a table showing a duty cycle of interruption timing for code 1 brushes of a solid state interrupter used in a telephone system;

Figure 1:
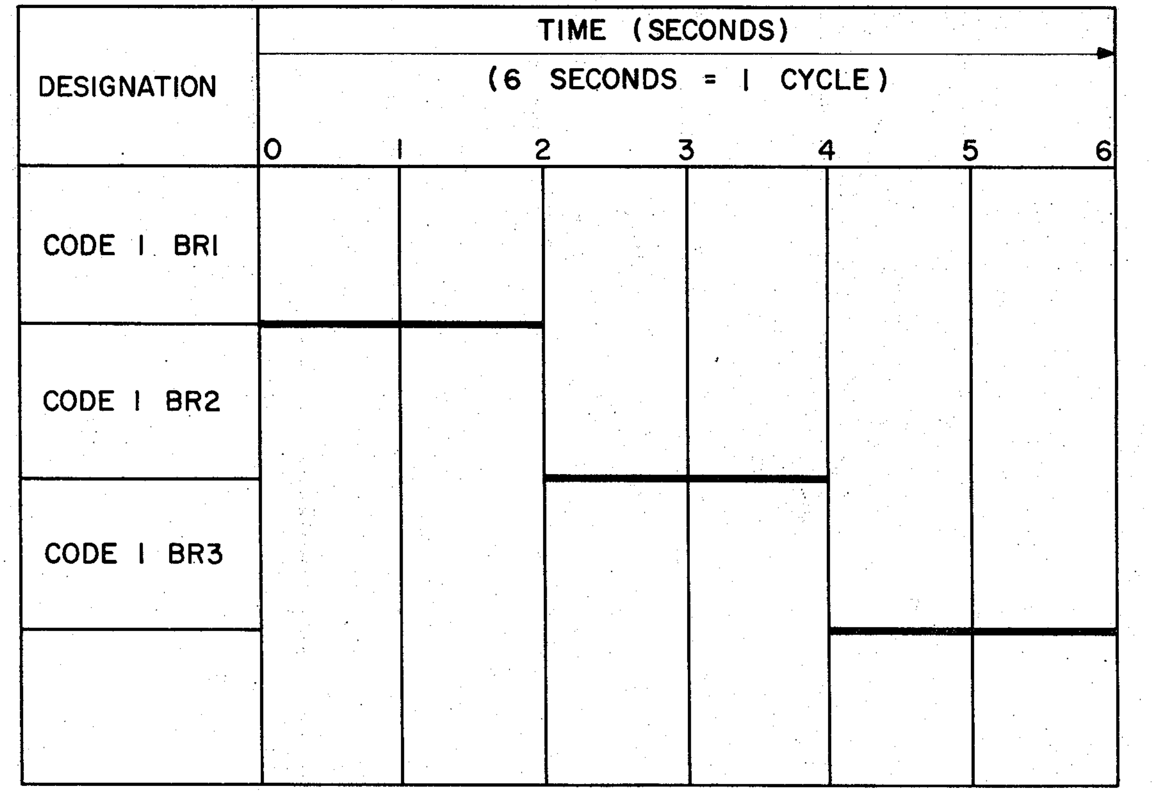

FIG. 1 shows the interruption timing table for an interrupter providing code 1 $BR_1$, code 1 $BR_2$, and code 1 $BR_3$ output signals. The cycle period is 6 seconds since each code 1 period has a 2 second duration and there are a total of 3 code 1 brushes.

Figure 2:
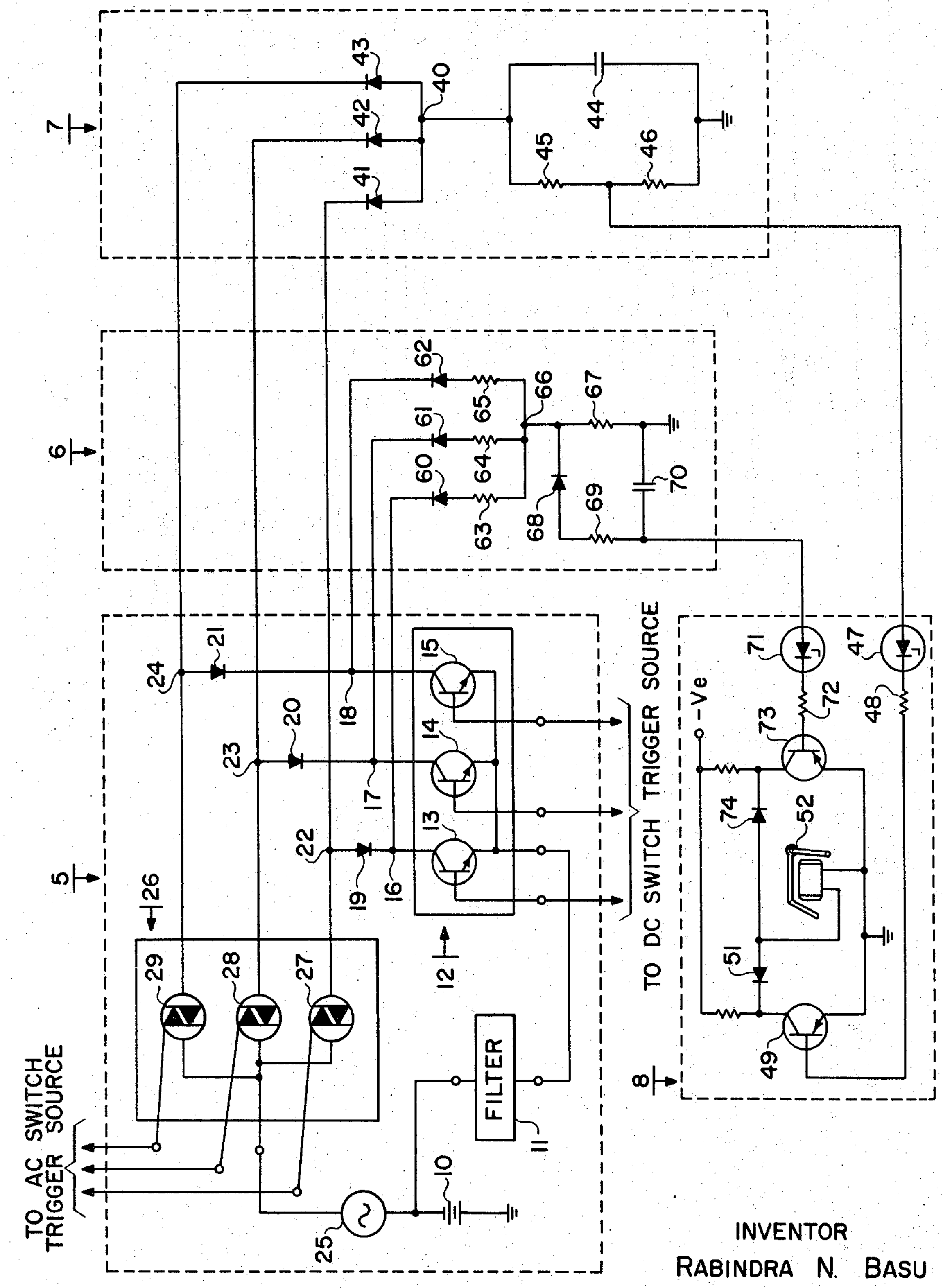
FIG. 2 is a schematic diagram of a switch-failure detector circuit in the form of a preferred embodiment of the invention herein described.

Reference to FIG. 2 illustrates a preferred embodiment of the invention in a schematic diagram form. In a solid state interrupter 5, a first source of voltage is shown as a battery 10 with the negative terminal connected through a filter 11 to the input terminal of a first switching means shown generally as a bank of solid state direct current switches 12. The individual direct current solid state switches therein are shown as switches 13, 14 and 15, each connected to a respective output terminal 16, 17, and 18 of a first set of output terminals. When triggered in a predetermined manner, the switches 13, 14, and 15 operate to energize the first set of output terminals 16, 17 and 18 to form a first set of switch signals. It will be noted that each terminal of the first set of output terminals is connected through a respective coupling means shown as a plurality of coupling diodes 19, 20 and 21 to a corresponding terminal of a second set of output terminals 22, 23 and 24.

The solid state interrupter 5 also reveals a second source of voltage shown as an alternating current generator 25 connected between the negative terminal of the battery 10 and the input terminal of a second switching means shown generally as a bank of solid state alternating current switches 26. The individual alternating current solid state switches therein are shown as switches 27, 28 and 29, each connected to a respective output terminal 22, 23 and 24 of the second set of output terminals. It will be noted that this particular circuit configuration places the voltage of the alternating current generator 25 in series with the voltage from the battery 10. The summed result of these two voltages is then applied to the input terminal of the bank of alternating current solid state switches 26 whereupon the summed voltage signal may be cyclically and sequentially switched by means of switches 27, 28 and 29, to energize the corresponding output terminals 22, 23 and 24 to form a second set of switch signals.

The timing sequence of the individual switches within the two ranks of switches 12 and 26 is such that the switches 13, 14, and 15 operate during the OFF intervals of the switches 27, 28, and 29 which operate one at a time. For example, when the switch 27 is ON then the switches 28 and 29 are OFF. Accordingly, the switches 14 and 15 are switched ON while the switch 13, which corresponds to the switch 27, is switched OFF. Thus, the output terminal 22 will be energized by the summed voltage, the battery 10 voltage superimposed on the alternating current voltage from the alternating current generator 25, whereas the output terminals 23 and 24 at this time will be energized by the battery 10 voltage applied through the filter 11, the turned ON switches 14, and 15 and their respective coupling diodes 20 and 21.

Separate trigger signals are required for each one of the switches in the solid state interrupter 5 in order to accomplish a predetermined switching sequence. Sources for such signals are not shown in FIG. 2 but are located elsewhere in the telephone system.

In view of the fact that the battery 10 and the alternating current generator 25 are used as voltage sources for the respective first and second sets of switch signals, the switch failure detection circuit of FIG. 2 is capable of detecting the failure of either of these voltage sources as well as any of the switches in the solid state interrupter 5. Instead of processing one signal for each switch to be monitored, the preferred embodiment of this invention processes only one output signal for each set of the two sets of switch signals generated. The first signal is used for monitoring the correct operation of the switches in the bank of solid state direct current switches 12 and the second output signal is used for monitoring the correct operation of the switches in the bank of solid state alternating current switches 26. Reference to FIG. 2 shows the connections for applying the first set of switch signals from the solid state interrupter 5 to a first signal detection and integration circuit 6 having a response which is to generate a first output signal in response thereto. FIG. 2 also shows the connections for applying the second set of switch signals from the solid state interrupter 5 to a second signal detection and integration circuit 7, having a response which is to generate a second output signal in response thereto. The first and second signals are then concurrently applied to a third signal detection circuit 8 which is responsive to the amplitude of the first and the second output signals and gives an indication of a switch failure when either output signal amplitude falls below a predetermined value.

It has already been described how the solid state interrupter 5 functions to generate two sets of switch signals. The following description shows how these two sets of switch signals are processed by the remainder of the circuitry comprising this specific embodiment of the invention in order to determine when failure occurs in either or both of the voltage sources used, and in any of the switches used in the solid state interrupter 5.

Figure 3:
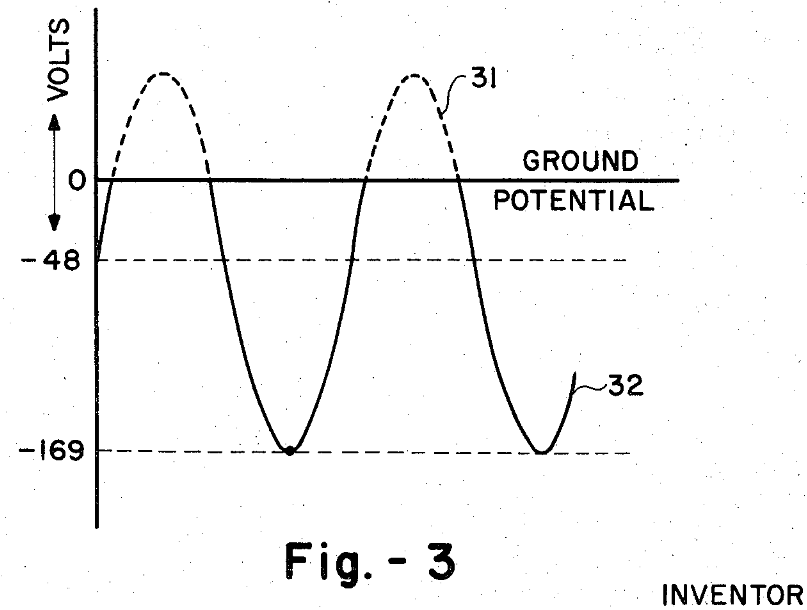
FIG. 3 is a diagram representing a ringing supply voltage waveform superimposed with a direct current component voltage.

FIG. 3 shows a ringing voltage signal waveform superimposed with a direct current component voltage, the summed voltage of the battery 10 and the alternating current generator 25, that is switched by the bank of solid state alternating current switches 26. As explained under normal conditions one of the switches 27, 28 or 29 remains ON at any instant. The ringing voltage signal of FIG. 3 is thus applied to one of the input diodes 41, 42 or 43, depending upon which of the output terminals 22, 23 or 24 is energized. The portion of the waveform curve drawn by a dotted line 31 represents the voltage clipped off by the input diodes 41, 42, and 43 and that by the solid line 32 represents the voltage available between the terminal 40 and ground.

The capacitor 44 is charged to a voltage of about the peak value of the ringing voltage signal appearing at the terminal 40 each time one of the switches 27, 28, and 29 operates. Once charged, the capacitor 44 then discharges at a rate depending on the value of its capacitance, and the value of the resistors 45 and 46 which are placed in a series shunt circuit configuration with it. However, the energy lost in the process is regained during a short interval of each following cycle. And, with a proper choice of values for the capacitor 44 and the resistors 45 and 46, the voltage developed at the junction of the resistors 45 and 46 can be assumed to remain fairly constant under normal conditions. In effect then, the voltage developed at the junction of the resistors 45 and 46 represents an integrated output signal which is coupled through a zener diode 47, in series with a resistor 48, to the base electrode of a transistor 49, which senses the amplitude of the said signal. But, if any one of the switches 27, 28 or 29 should fail to switch ON, the capacitor 44 will then further discharge through the resistors 45 and 46 for a time equivalent to that for which the faulty switch would have remained switch ON, i.e. 2 seconds. In that case, the voltage developed at the junction of the resistors 45 and 46 will drop to a lower value than that experienced when the switches 27, 28, and 29 function normally. On the other hand, if one of the switches 27, 28 or 29 becomes shorted, it will connect a corresponding coupling diode 19, 20, or 21 across the alternating current generator 25 through a corresponding switch 13, 14 or 15 in which case the respective coupling diode will load down the alternating current generator 25, and the voltage developed at the junction of the resistors 45 and 46 will again become low compared to the voltage at this point under normal conditions.

As discussed, the integrated output signal voltage developed at the junction of the resistors 45 and 46 is applied to the base electrode of the transistor 49. If the signal exceeds a predetermined value, then the transistor 49 will be biased into a conducting state. Accordingly, the voltage at the collector electrode of the transistor 49 will approach zero with the result that a minimum current flow will occur through the series connected diode 51, and the indicating device which is shown as an annunciator 52. This current will be insufficient to operate the annunciator 52. However, in the event of a switch malfunction as described, or in the event of a voltage source failure, the integrated output signal applied to the base electrode of the transistor 49 will be lower than the predetermined value thereby causing the transistor 49 to go into a non-conducting state. In this situation, the transistor 49 acts as an open circuit with the result that its collector voltage tends to rise to —48 volts. Sufficient current flow will then occur through the diode 51, and the annunciator 52 to actuate the annunciator and give an indication of a switch failure or the failure of a voltage source.

Another set of switch signals is obtained from the output terminals 16, 17, and 18 of the bank of solid state direct current switches 12. Depending upon which of the individual switches 13, 14 or 15 operates, will determine which diodes of the set of input diodes 60, 61 or 62, in the first signal detection integration circuit will receive these switch signals. The input diodes 60, 61, and 62 are each connected in series with a respective corresponding resistor 63, 64 and 65. The other end of each of these resistors is connected to a common terminal 66 from which is connected a resistor 67 to ground. It will be remembered that the switches 13, 14 and 15 are normally ON during the silent or OFF intervals of the corresponding switches 27, 28 and 29. Therefore, from FIG. 1 it will be apparent that, under normal conditions, at any instant two of the three switches 13, 14 and 15 are ON simultaneously so that a signal voltage developed across the resistor 67, will be greater under normal operation than it would be if one of the switches 13, 14 or 15 failed to switch ON. The simple reason for this is that under normal switching conditions two of the three resistors 63, 64 and 65 are paralleled and are placed in series with the resistor 67. But, in the malfunctioning condition mentioned, where one of the switches 13, 14 or 15 does not turn ON, only one of the resistors 63, 64 or 65 is placed in series with the resistor 67. Thus, in the switch malfunctioning situation the voltage developed at the terminal 66 is reduced since the effective resistance value of the single resistor in series with the resistor 67 is greater than in the case of normal operation where we have two resistors in parallel, in which case the voltage developed at the terminal 66 is higher because the effective resistance of the two resistors in series with the resistor 67 is lower.

The output signal voltage available at the terminal 66 is coupled through a diode 68, series connected with a resistor 69, to charge up a capacitor 70. The purpose of these three components is to prevent false operation of the annunciator 52. In the solid state interrupter 5, an intentional time delay is introduced between the switching OFF of a switch 27, 28, or 29, and the switching ON of the corresponding switches 13, 14 and 15. This gives rise to a momentary reduction in the voltage developed across the resistor 67, and hence tends to cause a false operation of the annunciator 52. However, this difficulty is overcome as a result of the time constant of the resistor 69, the back resistance of the diode 68 and the capacitor 70 which produces an integrating effect and tends to keep the voltage developed across the capacitor 70 constant.

The voltage developed across the capacitor 70 is coupled through a Zener diode 71 and through a resistor 72, series connected therewith, to the base electrode of a transistor 73. It should be mentioned that if there is no time delay between the switching OFF of the switches 27, 28 or 29 and the switching ON of the corresponding switches 13, 14 and 15, the diode 68, the resistor 69, and the capacitor 70 may be removed in which case the anode of the Zener diode 71 would be connected directly to the terminal 66.

The functioning of the transistor 73 and the diode 74 occurs in exactly the same manner as earlier described for the transistor 49 and its associated cirucit components. Thus, as a result of the respective output signal voltages obtained from the first signal detection and integration circuit 6 and the second signal detection and integration circuit 7, which signals are applied to the respective bases of the transistors 73 and 49, whenever there is an open circuit or a short circuit fault in either the bank of solid state direct current switches 12, or the bank of solid state alternating current switches 26, or if one of the voltage sources fails, the respective output signal voltages will decrease in amplitude, and this change will be detected and an alarm given by the third signal detection circuit 8.

What is claimed is.

1. A switch failure detection circuit comprising, in combination:

a first switching means having a plurality of first outputs for generating thereat a first set of corresponding sequential signals;

a second switching means having a plurality of second outputs for generating thereat a second set of corresponding sequential signals;

means to interconnect individual ones of the first and second outputs in pairs when the corresponding said signals coincide in sequence, which means act as a load between the said pairs to substantially reduce the amplitude of individual ones of the second set of sequential signals;

means to generate a first output signal in response to the amplitude and sequence of the first set of sequential signals;

means to generate a second output signal in response to the amplitude and sequence of the second set of sequential signals; and, means responsive to the amplitudes of the output signals for giving an indication of a switch failure when either output signal amplitude falls below a predetermined value.

2. A switch failure detection circuit comprising, in combination: a first source of voltage; a first switching means having input terminals connected across the first source of voltage, for switching the voltage to sequentially and cyclically energize a first set of output terminals, the switched voltage comprising a first set of switch signals; a second source of voltage serially connected with the first source of voltage to provide a summed source of voltage; a second switching means having input terminals connected across the summed source of voltage, for switching the summed voltage to sequentially and cyclically energize a second set of output terminals, the switched summed voltage comprising a second set of switch signals; wherein, the first to the last terminals of the first set of output terminals respectively correspond to the first to the last terminals of the second set of output terminals, and wherein, both sets of output terminals are energized in a predetermined sequence in which any one terminal of the second set of output terminals is energized concurrently with all the terminals of the first set of output terminals save the one terminal which corresponds to the one energized terminal of the second set of output terminals; a plurality of signal coupling means, each one of the signal coupling means interconnecting corresponding terminals of the first and second sets of output terminals, and any one of the signal coupling means acting as a load across the second source of voltage in the event of a fault condition in which any corresponding pair of output terminals are concurrently energized, which load substantially decreases the summed voltage; a first and a second signal detection and integration means, responsive to the amplitude and sequence of each respective first and second set of switch signals, for producing first and second output signals; and, a third signal detection means responsive to the amplitudes of the first and second output signals, for giving an indication of a switch failure when either output signal amplitude falls below a predetermined value.

3. A switch failure detection circuit as defined in claim 2 wherein: the first switching means comprises three controllable switch devices, each switch device being serially connected between the input terminal and a separate terminal of the first set of output terminals; the second switching means comprises three controllable switch devices, each switch device being serially connected between the input terminal and a separate terminal of the second set of output terminals; the signal coupling means are diodes; the first and the second signal detection and integration means each comprise a set of input diodes having separate input connections operatively connected to a respective set of the said output terminals and each set of input diodes having a common output connection, which input diodes are connected in an OR gate configuration wherein each respective common output connection is connected to a corresponding signal integration network; and wherein the third signal detection means comprises a first and a second amplifier for amplifying respectively the first and the second output signals and for concurrently operating an electromagnetic signalling device which is responsive to the operating condition of either amplifier.

References Cited

UNITED STATES PATENTS

| | | | |
|---|---|---|---|
| 3,345,522 | 10/1967 | Reuther | 324—73X |
| 3,440,524 | 4/1969 | DeJarld | 324—28 |

GERARD R. STRECKER, Primary Examiner